United States Patent [19]
Yamamoto

[11] Patent Number: 5,274,720
[45] Date of Patent: Dec. 28, 1993

[54] OPTICAL SYSTEM HAVING A RING-SHAPED WAVEGUIDE

[75] Inventor: Toshio Yamamoto, Tokyo, Japan
[73] Assignee: Olympus Optical Co., Ltd., Tokyo, Japan
[21] Appl. No.: 932,971
[22] Filed: Aug. 20, 1992

[30] Foreign Application Priority Data

| Aug. 22, 1991 | [JP] | Japan | 3-211133 |
| Sep. 27, 1991 | [JP] | Japan | 3-248943 |
| Mar. 31, 1992 | [JP] | Japan | 4-78007 |
| Jul. 27, 1992 | [JP] | Japan | 4-199563 |
| Jul. 31, 1992 | [JP] | Japan | 4-205405 |

[51] Int. Cl.$^5$ .................. G02B 6/10; G02B 6/34
[52] U.S. Cl. ..................... 385/129; 385/37; 359/569; 359/574
[58] Field of Search ............ 385/14, 31, 37, 129, 385/130; 359/566, 569, 574, 575, 576

[56] References Cited

U.S. PATENT DOCUMENTS

| 3,982,810 | 9/1976 | Tamir et al. | 385/129 |
| 4,743,083 | 5/1988 | Schimpe | 385/37 |
| 4,991,919 | 2/1991 | Nishiwaki et al. | 385/37 |
| 5,082,340 | 1/1992 | Aoshima et al. | 359/328 |
| 5,159,650 | 10/1992 | Nishiwaki et al. | 385/37 |

OTHER PUBLICATIONS

Appl. Phys. Lett. 60(3), Jan. 20, 1992, Whispering-gallery mode microdisk lasers; pp. 289-291, by S. L. McCall et al.
Appl. Phys. Lett. 59 (26), Dec. 23, 1991, Single-frequency continuous-wave operation of ring resonator diode lasers; pp. 3360-3362, by J. P. Hohlmer et al.

*Primary Examiner*—Frank Gonzalez
*Attorney, Agent, or Firm*—Frishauf, Holtz, Goodman & Woodward

[57] ABSTRACT

An optical connector comprises a ring-shaped waveguide and a straight waveguide for introducing a light beam into the waveguide. These waveguides are arranged on a substrate in a manner such that the gap between their nearest positions is not longer than the wavelength of the light beam. The radius, width, thickness, and refractive index distribution of the ring-shaped waveguide are set so that a light beam with a wavelength $\lambda = 2\pi r/n$ (r and n are the radius of the ring-shaped waveguide and a certain natural number, respectively) continues to circulate therein. A grating having a cycle of $2\pi r\lambda/(2\pi r+\lambda)$ or $2\pi r\lambda/(2\pi r-\lambda]$ is formed on the surface of the ring-shaped waveguide.

34 Claims, 18 Drawing Sheets

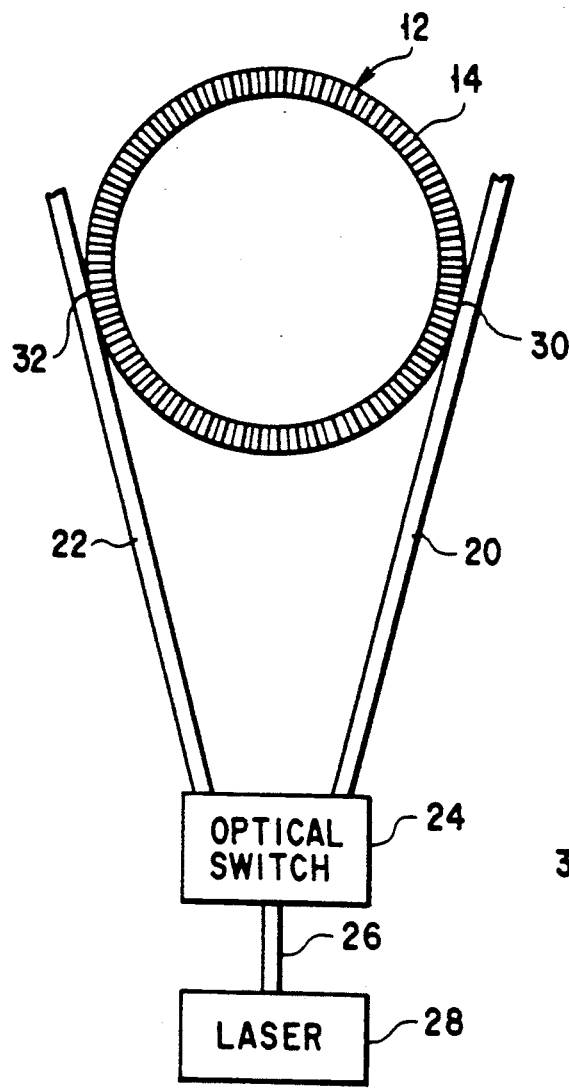
F I G. 3
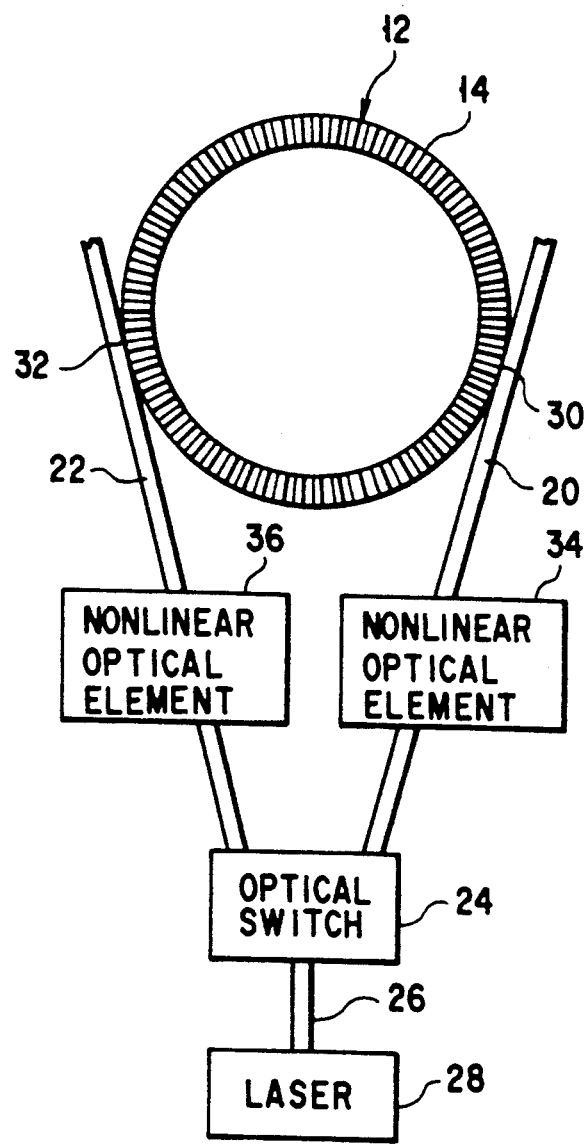
F I G. 4

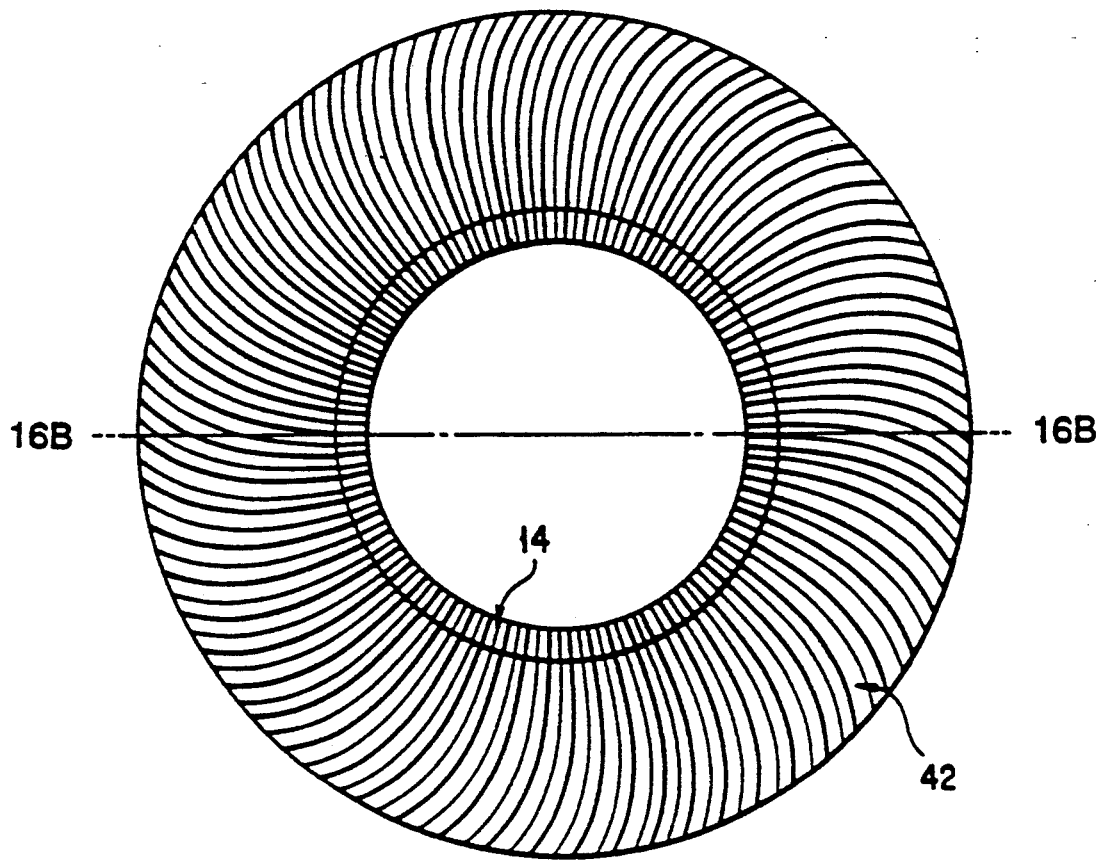
F I G. 16A
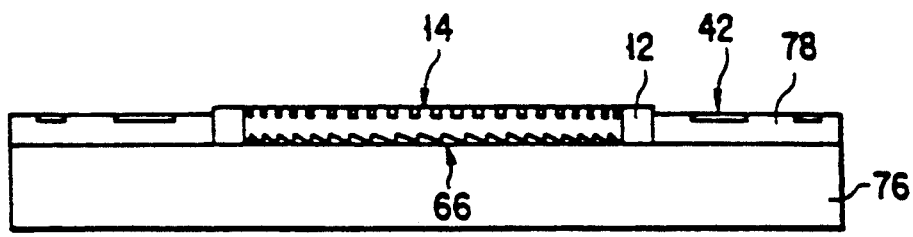
F I G. 16B

OPTICAL SYSTEM HAVING A RING-SHAPED WAVEGUIDE

BACKGROUND OF THE INVENTION

1. Field of the Invention

The present invention relates to optical systems including an optical connector, laser apparatus, etc.

2. Description of the Related Art

Recently, there has been a trend toward integration of lasers with other optical parts. In some cases, a laser beam emitted from a laser and advancing in a direction parallel to a substrate must be coupled to a light beam which advances at right angles or a specific angle to the substrate.

Conventionally, this is attained by guiding the output laser beam from the laser to a straight waveguide, and coupling it to a light beam radiated to the outside of the substrate, by means of a grating arranged on the upper surface of the waveguide.

In an optical connector designed for this purpose, the light beam is exponentially attenuated as it passes under the grating. If the coupling efficiency is increased so that a greater volume of light can be taken out, therefore, the light beam radiated from the grating enjoys an intensity distribution such that it becomes more intense with distance from the emission side. The light beam with such an intensity distribution is not desirable for use. Generally, moreover, the grating is too long. If the light beam to be radiated from the grating has a uniform intensity, on the other hand, the coupling efficiency is considerably lowered.

The light beams which can be taken out by means of the optical connector of this type are limited to straight polarized light. This imposes restrictions on optical design, and many optical systems utilize circular polarized light.

Accordingly, there is a demand for compact optical elements which can efficiently couple radiant light beams having a uniform intensity distribution and a high degree of freedom for polarized light. In many cases, moreover, a laser having a Fabry-Perot resonator should be provided with a resonator end mirror in a substrate, which constitutes a substantial hindrance to integration. In order to cope with this, the so-called ring laser apparatus is under investigation in which a ring-shaped waveguide is used as the resonator. Since light continues to circulate through the waveguide in the ring laser apparatus, there is no need of a reflective end face which is essential to the Fabry-Perot resonator. The ring laser apparatus is provided with a waveguide which is connected to or extends beside the ring-shaped waveguide, whereby light is taken out from the waveguide. A light beam introduced into the waveguide is taken out by means of the optical connector which has the grating on its surface, as mentioned before.

In the case of this system, there is the problem of an optical loss at the junction between the ring and straight portion, as well as the aforesaid problem of the optical connector itself. Further, the system occupies an increased volume in the whole apparatus. Under these circumstances, there is a demand for a more immediate method for taking out light from the ring laser apparatus having the ring-shaped waveguide to the outside of the substrate.

SUMMARY OF THE INVENTION

An object of the present invention is to provide an optical system for emitting a light beam having an intensity distribution symmetric with respect to the center.

Another object of the invention is to provide an optical system for emitting circular polarized light.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 shows an optical connector according to a second embodiment of the invention;

FIG. 4 shows an optical connector according to a third embodiment of the invention;

FIG. 16A is a top view of a ring laser apparatus according to a ninth embodiment of the invention;

FIG. 16B is a sectional view of the ring laser apparatus taken along line 16B—16B of FIG. 16A;

DETAILED DESCRIPTION OF THE PREFERRED EMBODIMENTS

Preferred embodiments of the present invention will now be described with reference to the accompanying drawings. The drawings illustrate system arrangements of the embodiments only diagrammatically, and the illustrated sizes of ring-shaped waveguides, gratings, etc. are different from actual ones.

Figure 1A:
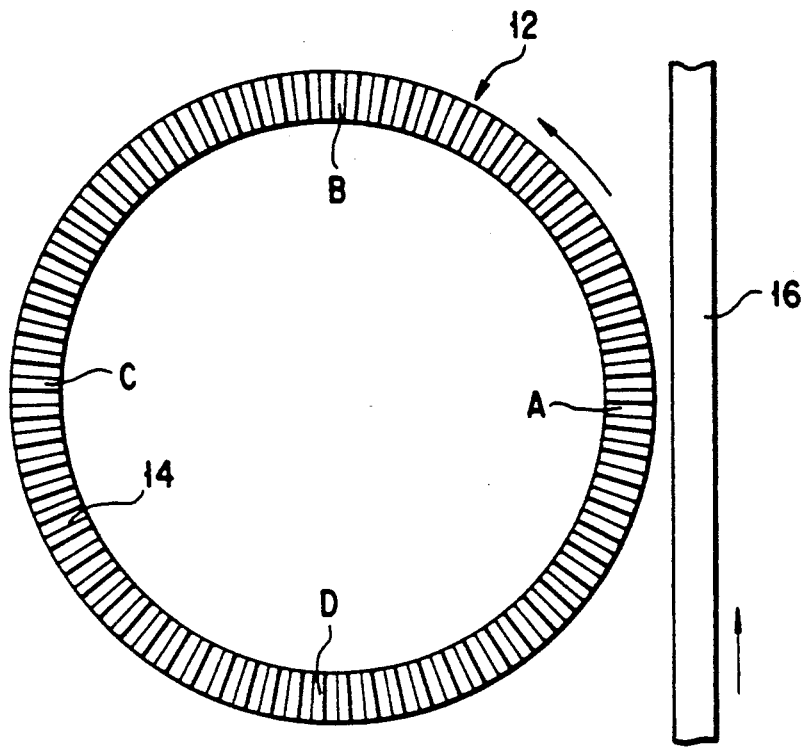
FIG. 1A is a top view of an optical connector according to a first embodiment of the present invention.
Figure 1B:
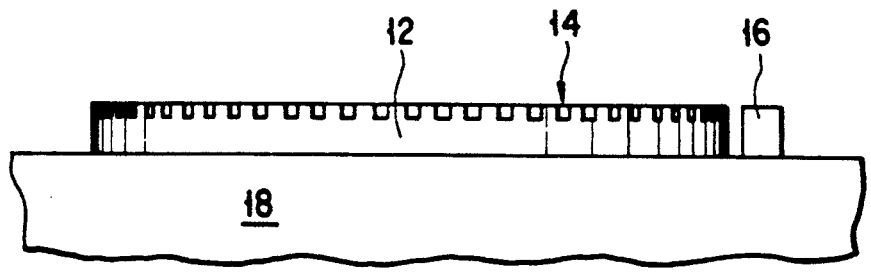
FIG. 1B is a side view of the optical connector shown in FIG. 1A.
Figure 2:
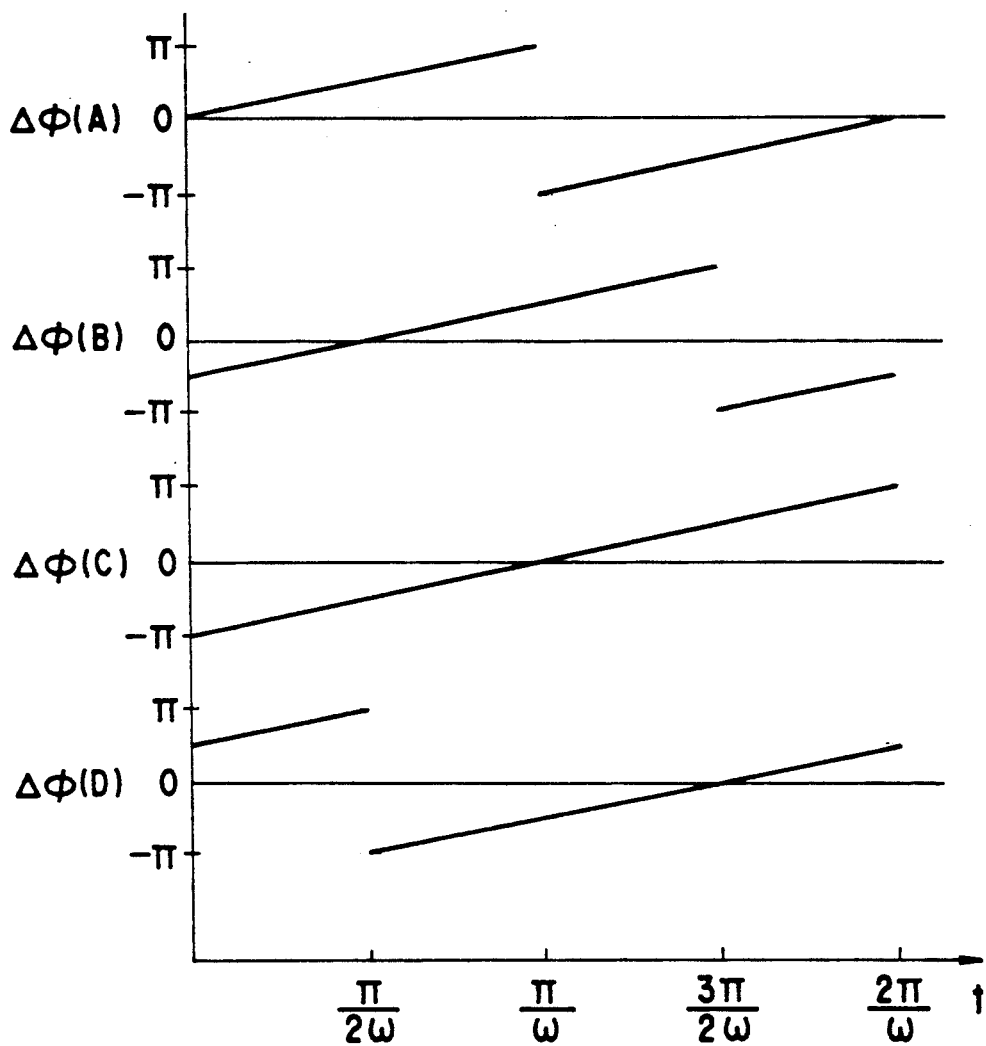
FIG. 2 shows time-based transitions of phase differences between propagated light and a grating at points A to D shown in FIG. 1A.

Referring now to FIGS. 1A, 1B and 2, an optical connector according to a first embodiment of the present invention will be described. The optical connector of the present embodiment comprises a ring-shaped waveguide 12 and a straight waveguide 16 for introducing a light beam into the waveguide 12. The waveguides 12 and 16 have a width substantially equivalent to the wavelength of the light beam used. These waveguides are arranged on a substrate 18 in a manner such that the gap between their nearest positions is not longer than the wavelength of the light beam. When the light beam is incident upon the straight waveguide 16, directed as indicated by the arrow, part of the light beam propagated through the waveguide 16 gets into the ring-shaped waveguide 12 in the vicinity of a point A at which the waveguides 16 and 12 are situated nearest to each other. The radius, width, thickness, and refractive index distribution of the ring-shaped waveguide 12 are set so that a light beam with a wavelength $\lambda = 2\pi r/n$ (r and n are the distance between the optical path in the waveguide 12 and the center of curvature of a waveguide 12 and a certain natural number, respectively) continues to circulate in the direction of the arrow.

A grating 14 having a cycle of $2\pi r \lambda/(2\pi r + \lambda)$ or $2\pi r \lambda/(2\pi r - \lambda)$ is formed on the surface of the ring-shaped waveguide 12. The point A is set on the waveguide 12, and three points arranged at angular intervals of $\pi/2$ on waveguide 12 are designated by B, C and D, individually. Phase differences between the light beams and the grating at the individual points A, B, C and D are given by $\Delta\phi(A)$, $\Delta\phi(B)$, $\Delta\phi(C)$ and $\Delta\phi(D)$, respectively. FIG. 2 shows time-based transitions of $\Delta\phi(A)$, $\Delta\phi(B)$, $\Delta\phi(C)$ and $\Delta\phi(D)$ observed when $t=0$ and $\Delta\phi(A)=0$ are given.

Let us suppose a case that light beams emitted from regions near the points A, B, C and D are viewed from a point on an axis which passes through the center O of the ring-shaped waveguide 12 at right angles to the substrate 18. If the electric field of the light beam from the region near the point A has its maximum size when $t=0$ is given, the light beam from the region near the point C also has its maximum size. Those components of the light beams which are perpendicular to the respective axes of the electric fields have the same direction. This is because the light beams at the points A and B advance in opposite directions, and $\Delta\phi(A)$ and $\Delta\phi(B)$ always have a difference of $\pi$. At this time, the respective electric fields of the light beams from the regions near the points B and D have their minimum size. This is because $\Delta\phi(B)$ and $\Delta\phi(D)$ differ from $\Delta\phi(A)$ by $\pi/2$ and $-\pi/2$, respectively. Since the respective polarizing directions of the light beams emitted from the grating are fixed with respect to the spreading direction of the grating, a straight polarized beam having a specific polarizing direction is radiated at the moment of $t=0$.

The point at which the electric field of the radiation beam has its maximum size moves with the passage of time. While the point A is the point at which the electric field of the radiation beam has its maximum size with $t=0$, this point moves to the points B, C and D and then returns to the point A, in the direction of the arrow, with the passage of time. As this is done, the polarization face of the radiation beam rotates. As a result, the radiation beam is a circular polarized light beam if the coupling efficiency of the grating is fixed without regard to the angular direction with respect to the center O. Further, an elliptic polarized beam can be easily obtained by changing the coupling efficiency of the grating in accordance with the angular direction with respect to the center O.

Thus, in the optical connector according to the present invention, the light beam introduced into the ring-shaped optical waveguide continues to be radiated by the grating while circulating through the waveguide, so that the coupling efficiency is high enough to take out plenty of light. Since the radiated light beam is emitted from the circular ring-shaped grating, moreover, so that it exhibits a satisfactory intensity distribution which is symmetric with respect to the center. Further, a desired circular or elliptic polarized beam can be obtained by adjusting the coupling efficiency of the grating according to the purpose of use.

Referring now to FIG. 3, an optical connector according to a second embodiment of the present invention will be described. In the present embodiment, two straight waveguides 20 and 22 are arranged extending beside a ring-shaped waveguide 12. These waveguides 20 and 22 are connected to an optical switch 24. The switch 24 selects one of the waveguides 20 and 22, and a laser beam emitted from a laser 28 is supplied to the selected straight waveguide through a waveguide 26. The wavelength of the laser beam is previously adjusted so that it is $2\pi r/n$.

If the optical switch 24 selects the straight waveguide 20, the laser beam emitted from the laser 28 is propagated through the waveguide 20, and part of it gets into the ring-shaped waveguide 12 via a bordering point 30 between the waveguides 20 and 12, whereby a left-handed traveling wave is excited in the waveguide 12. As a result, a left-handed circular polarized beam is radiated from a grating 14 on the upper surface of the ring-shaped waveguide 12.

If the optical switch 24 selects the straight waveguide 22, on the other hand, the laser beam emitted from the laser 28 is propagated through the waveguide 22, and part of it gets into the ring-shaped waveguide 12 via a bordering point 32 between the waveguides 22 and 12, whereby a right-handed traveling wave is excited in the waveguide 12. As a result, a right-handed circular polarized beam is radiated from a grating 14 on the upper surface of the ring-shaped waveguide 12.

Thus, the right- or left-handed circular polarized beam can be alternatively obtained by only making a change between the straight waveguides 20 and 22 for laser beam inputting, by means of the optical switch 24. Thus, in contrast with the case of the conventional method in which various filters are mechanically replaced for polarized beam conversion, a very simple construction can be enjoyed, and the structural durability need not be considered. Further, the time required for the change of the rotating direction of the circular polarized beam depends on the response time of the switch 24, so that the polarized beam conversion can be effected in a very short time.

Referring now to FIG. 4, an optical connector according to a third embodiment of the present invention will be described. In FIGS. 3 and 4, like reference numerals refer to the same members throughout the views, and a detailed description of those members is omitted. In the optical connector of the present embodiment, an optical switch 24 has a function to select both of two straight waveguides 20 and 22 simultaneously, as well as a function to select one of the waveguides 20 and 22 alternatively. The waveguides 20 and 22 are provided, respectively, with nonlinear optical elements 34 and 36 formed of $LiNbO_3$ or the like. The elements 34 and 36 are situated halfway between the optical switch 24 and bordering points 30 and 32 on a ring-shaped waveguide 12, respectively. The nonlinear elements 34 and 36 serve to control the respective phases of laser beams propagated through their corresponding straight waveguides 20 and 22.

If the optical switch 24 selects either of the two straight waveguides 20 and 22, a right- or left-handed circular polarized beam can be alternatively obtained, just as in the case of the second embodiment.

If the optical switch 24 selects both of the straight waveguides 20 and 22, laser beams of the same intensity are applied individually to the waveguides 20 and 22. Part of the beam propagated through the waveguide 20 advances into the ring-shaped waveguide 12 via the bordering point 30, thereby exciting a left-handed traveling wave in the waveguide 12. Likewise, part of the beam propagated through the waveguide 22 advances into the waveguide 12 via the bordering point 32, thereby exciting a right-handed traveling wave in the waveguide 12. Thus, the two traveling waves of the same intensity, which are opposite in direction, are excited in the ring-shaped waveguide 12, so that a straight polarized beam is delivered from a grating 14 on the upper surface of the waveguide 12. The polarizing direction of the straight polarized beam can be optionally selected by controlling the respective phases of the laser beams, propagated through the straight waveguides 20 and 22, by means of the two nonlinear optical elements 34 and 36.

Thus, according to the present embodiment, the right- or left-handed circular polarized beam can be alternatively obtained by selecting one of the straight waveguides 20 and 22 by means of the optical switch 24, and the straight polarized beam can be obtained by simultaneously selecting both the straight waveguides 20 and 22 by means of the switch 24. Also, the polarizing direction of the straight polarized beam can be changed as required by controlling the respective phases of the laser beams, propagated through the straight waveguides 20 and 22, by means of the nonlinear optical elements 34 and 36.

Figure 5:
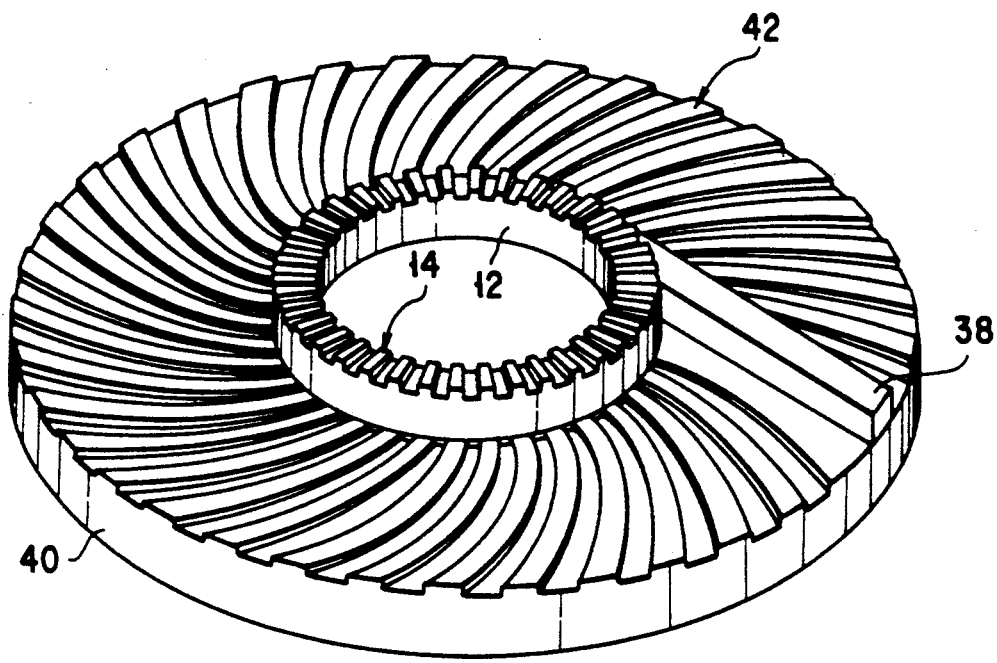
FIG. 5 is a perspective view of an optical connector according to a fourth embodiment of the invention.
Figure 6:
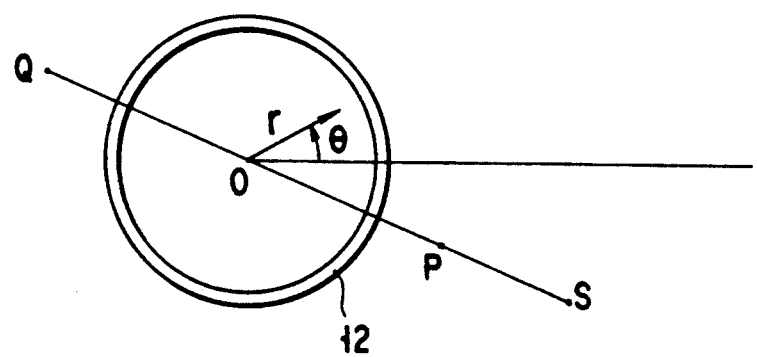
FIG. 6 shows a coordinate system established in considering light leaked from a ring-shaped waveguide.
Figure 7:
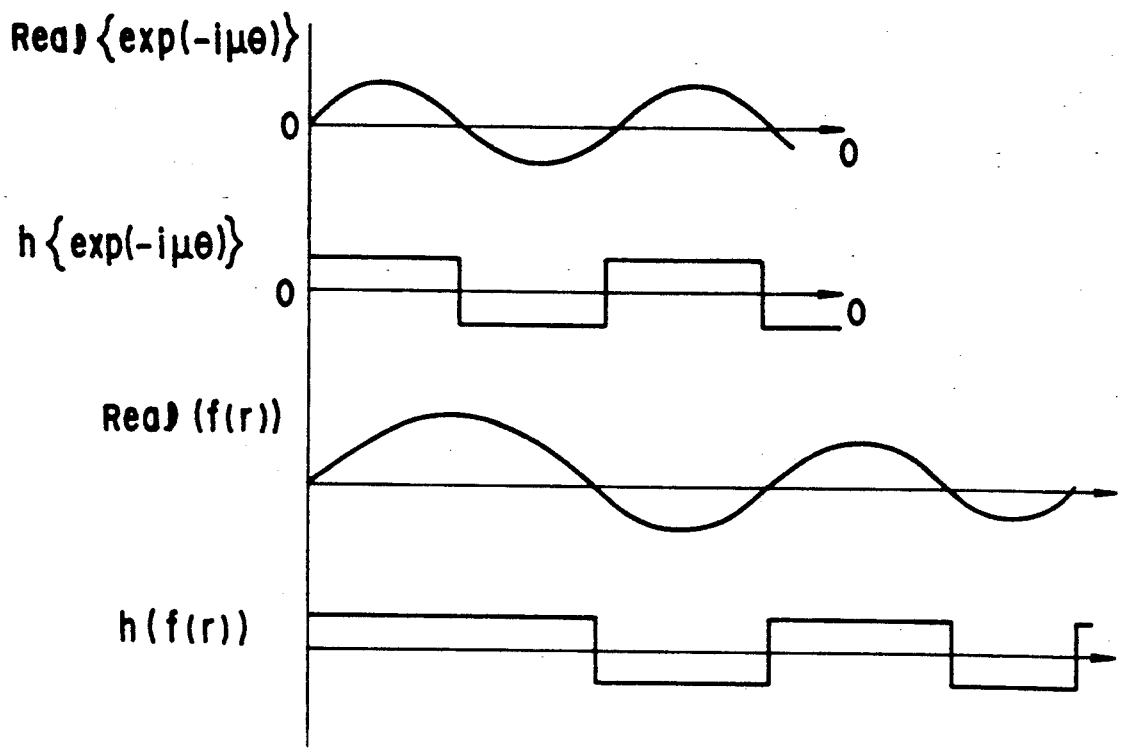
FIG. 7 illustrates a function h(x) for determining the height of the grating.

Referring now to FIGS. 5 to 7, an optical connector according to a fourth embodiment of the present invention will be described. As shown in FIG. 5, the optical connector of the present embodiment comprises a ring-shaped waveguide 12 and a straight waveguide 38 for introducing a light beam into the waveguide 12. These components are arranged on a substrate 40. The waveguide 38 is smoothly connected to the waveguide 12. Teeth of a grating 14 on the upper surface of the ring-shaped waveguide 12 are formed along straight lines which pass through the center of the waveguide 12. This arrangement is based on the fact that an r-direction phase shift of an electromagnetic field in the waveguide 12 is so small that it is negligible. Also arranged on the upper surface of the substrate 40 is another grating 42 for coupling a light beam leaked from the ring-shaped waveguide 12 due to bending, to the outside. The grating 42 has as many teeth as those of the grating 14. The radial cycle of the grating 42, which is not fixed, agrees with the cycle of the phase shift of the light beam leaked from the ring-shaped waveguide to the outside. This situation can be explained using the following equations.

In a coordinate system shown in FIG. 6, the electric field may be expressed as follows:

$$E(r, \theta, t) = \exp(i\omega t) \cdot \exp(-i\nu\theta) \cdot f(r), \qquad (1)$$

where f(r) is a complex function. On the other hand, the height of the grating may be expressed as follows:

$$H_G(r, \theta) = h\{\exp(-i\mu\theta) \cdot f(r)\}. \qquad (2)$$

where $(\mu - \nu)$ is an odd number. The function h(x) is a function which is used to convert the phase of x to the height of the grating. In many cases, the grating is step-shaped, h(x) is a two-valued function, as shown in FIG. 7.

Let us suppose an optional point P whose coordinate position is given by $(r_p, \theta_p)$. If an electric field from the point P has its maximum size at a certain time, an electric field from a point Q $(r_p, \theta_p + \pi)$ which is symmetric to the point P with respect to the origin 0 also has its maximum size, so that outputs from the points P and Q intensify each other on an axis which passes through the origin 0 at right angles to the drawing plane of FIG. 6.

Then, let us suppose a point S whose coordinate position is given by $(r_s, \theta_p)$. The respective r-direction phase shifts of the electric field and the grating are identical, and the difference between them is fixed with respect to the r-direction, so that an output from the point S intensifies the output from the point P, and vice versa. Thus, on an axis distant enough from the drawing plane, the outputs from the points P and S intensify each other.

If all of outputs from optional points, including the points P, Q and S, are added up, a circular polarized beam can be obtained at a fully distant point on the axis, in the end.

A suitable complex function is selected as f(r) of equation (1) in consideration of various conditions. In the case of the present embodiment, a Hankel function is a reasonable choice for the purpose. This is because if an electromagnetic field in a coordinate system (r, $\theta$, z) is capable of variable separation with respect to the r-direction, a representative component $\phi$ of the electromagnetic field satisfies a Bessel equation given by $$\{(\partial^2/\partial r^2 + (1/r)(\partial/\partial r) + k^2 - \nu^2/r^2)\}\phi = 0 \quad (3)$$

and $\phi$ for the case of the radiated light beam can be expressed by a Hankel function $H\nu^{(2)}(kr)$, where $$k^2 = k_0^2 - k_z^2,$$

$$k_z^2\phi = -(\partial^2\phi/\partial z^2).$$

$H\nu^{(2)}$ is a Hankel function of the second kind.

The grating 42 is formed according to equation (2) by approximation using the Hankel function as f(r) in this manner.

Thus, the light beam radiated to the outside of the ring-shaped waveguide 12 is radiated out of the surface of the grating 42 in a manner such that it intensifies an output from the grating 14, and vice versa. As a result, an optical connector can be obtained which radiates a circular polarized beam with a high coupling efficiency.

Figure 8:
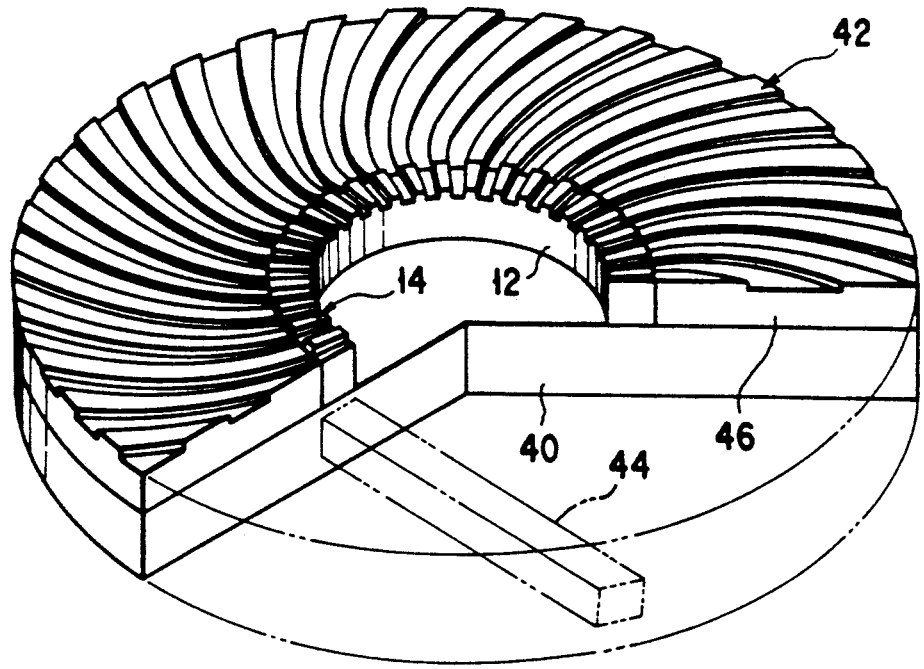
FIG. 8 is a perspective view of an optical connector according to a fifth embodiment of the invention.

Referring now to FIG. 8, an optical connector according to a fifth embodiment of the present invention will be described. In the present embodiment, a trapping layer 46 is arranged outside a ring-shaped waveguide 12. A grating 42 having the configuration described in connection with the fourth embodiment is formed on the upper surface of the trapping layer 46. A straight waveguide 44 for introducing a light beam into the waveguide 12 is formed in a substrate 40. The straight waveguide 44 passes under the ring-shaped waveguide 12 in a manner such that a distance substantially as long as the wavelength is kept between the waveguides at the point where they are nearest to each other.

A light beam leaked out from the ring-shaped waveguide 12 spreads in the z-direction which is perpendicular to the upper surface of the waveguide 12. In the optical connector of the arrangement described in connection with the fourth embodiment, therefore, if the distance r from the center becomes greater, the efficiency of the grating 42 to couple the leakage light beam to the light beam radiated out of the grating surface is lowered in proportion. In the present embodiment, the trapping layer 46, which is arranged outside the ring-shaped waveguide 12, serves to confine the leakage light beam from the waveguide 12 to the inside, thereby restraining it from spreading in the r-direction.

The trapping layer 46 also serves as a cladding layer for the ring-shaped waveguide 12. In this case, the refractive index n46 of the layer 46 must satisfy 1 (refractive index of air) < n46 < n12 and n40 < n46, where n12 and n40 are the refractive indexes of the waveguide 12 and the substrate 40, respectively. If these requirements are fulfilled, the trapping layer 46 functions as a core of the substrate 40, so that the light beam leaked in the z-direction from the waveguide 12 is reduced.

Thus, the leakage light beam from the ring-shaped waveguide 12 is kept confined by the trapping layer 46 as it is coupled to the outside, so that a high coupling efficiency can be enjoyed.

Figure 9A:
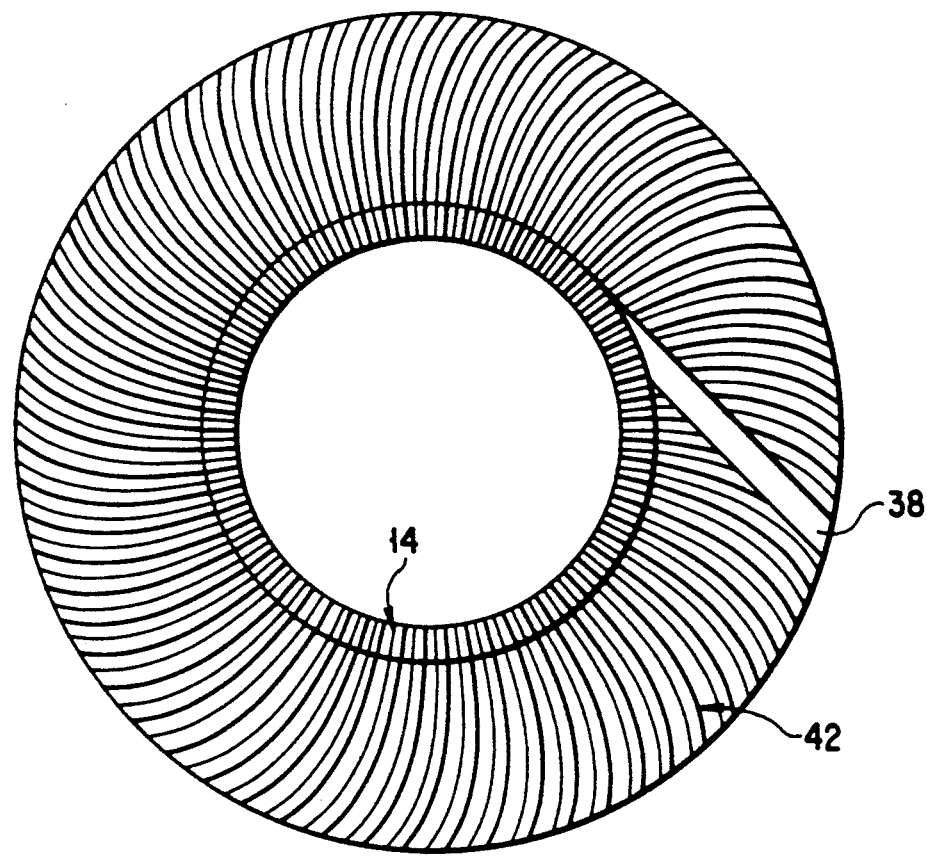
FIG. 9A is a top view of an optical connector according to a sixth embodiment of the invention.
Figure 9B:
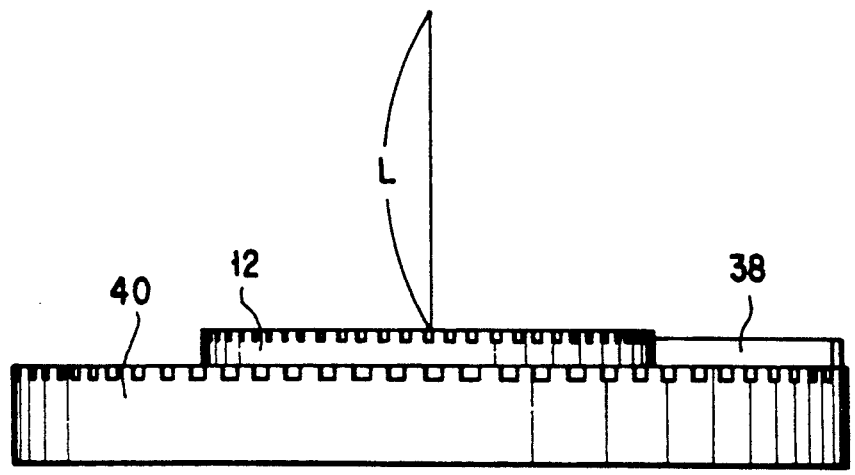
FIG. 9B is a side view of the optical connector shown in FIG. 9A.
Figure 10:
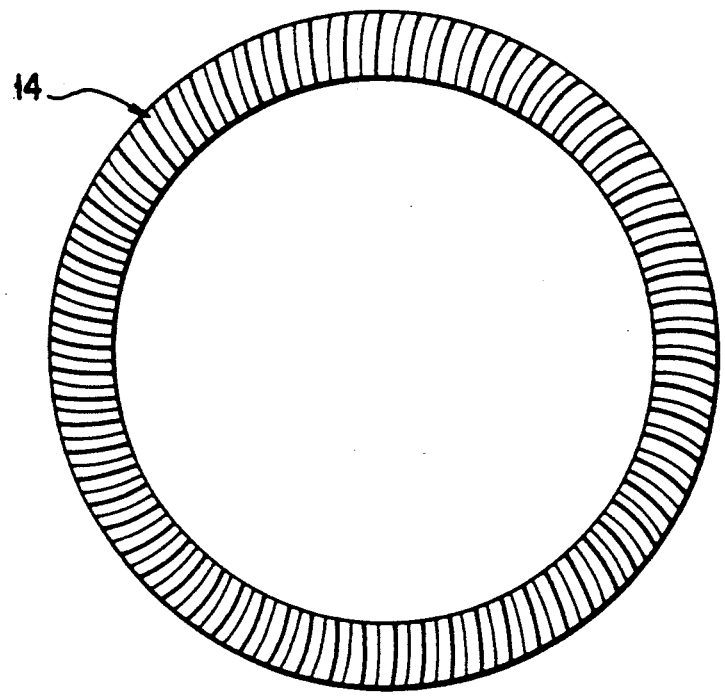
FIG. 10 is an enlarged view of a grating on the upper surface of a ring-shaped waveguide of the optical connector shown in FIG. 9A.

Referring now to FIGS. 9A, 9B and 10, an optical connector according to a sixth embodiment of the present invention will be described. In the optical connector of the present embodiment, as compared with the optical connector of the fourth embodiment, the gratings are modified so that outputs intensify one another at one point (focal point) on a central axis at a finite distance from a ring-shaped waveguide. If the distance from the center of the ring-shaped waveguide 12 to the focal point is L, as shown in FIG. 9B, the optical path of a light beam radiated from a point at a distance r from the central axis is given by $$\Delta u = \sqrt{L^2 + r^2}.$$

In the fourth embodiment, the infinite point is considered to be the focal point, so that a variation of $\Delta u$ associated with a change of r can be ignored. According to the present embodiment, however, the focal point is set at the finite distance L from the waveguide center, so that the variation cannot be ignored. Accordingly, gratings 14 and 42 of the optical connector of the sixth embodiment are formed in the following manner, taking account of an optical path difference based on the distance r from the central axis.

The grating 42 outside the ring-shaped waveguide 12 is formed on the basis of a modified version of HG, modified with respect to E(r, $\phi$, t) of equation (1) and given as follows:

$$H_G = h[\exp\{-i(\mu\theta \pm \Delta uk)\} \cdot f(r)],$$

where k is the number of waves in a medium (usually air) over the optical connector including the focal point, and the double sign turns to a plus sign for traveling waves in the $+\theta$-direction and to a minus sign for traveling waves in the $-\theta$-direction.

The grating 14 on the upper surface of the ring-shaped waveguide 12 is formed in accordance with $h[\exp\{-i(\mu\theta \pm \Delta uk)\}]$. As shown in FIG. 10, this grating is shifted by rotation for $\pm\Delta uk$ in the $\theta$-direction with respect to the grating 14 according to the fourth embodiment.

Figure 11:
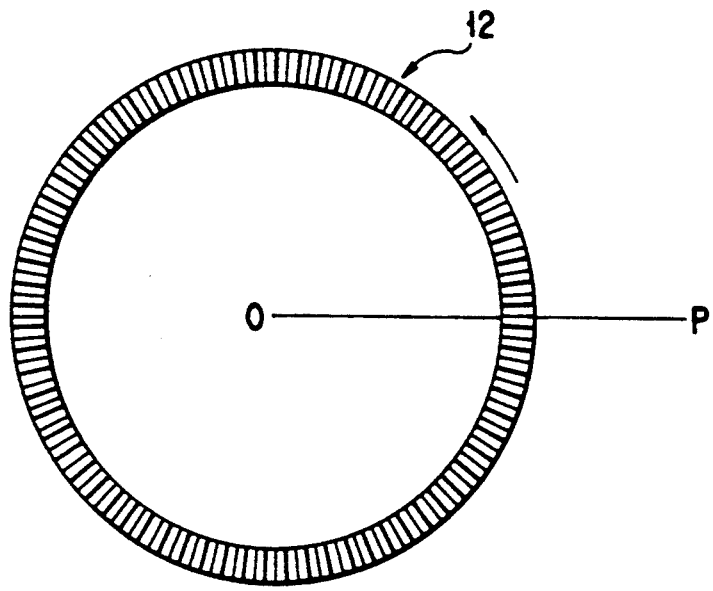
FIG. 11 is a top view of a ring laser apparatus according to a seventh embodiment of the invention.
Figure 12:
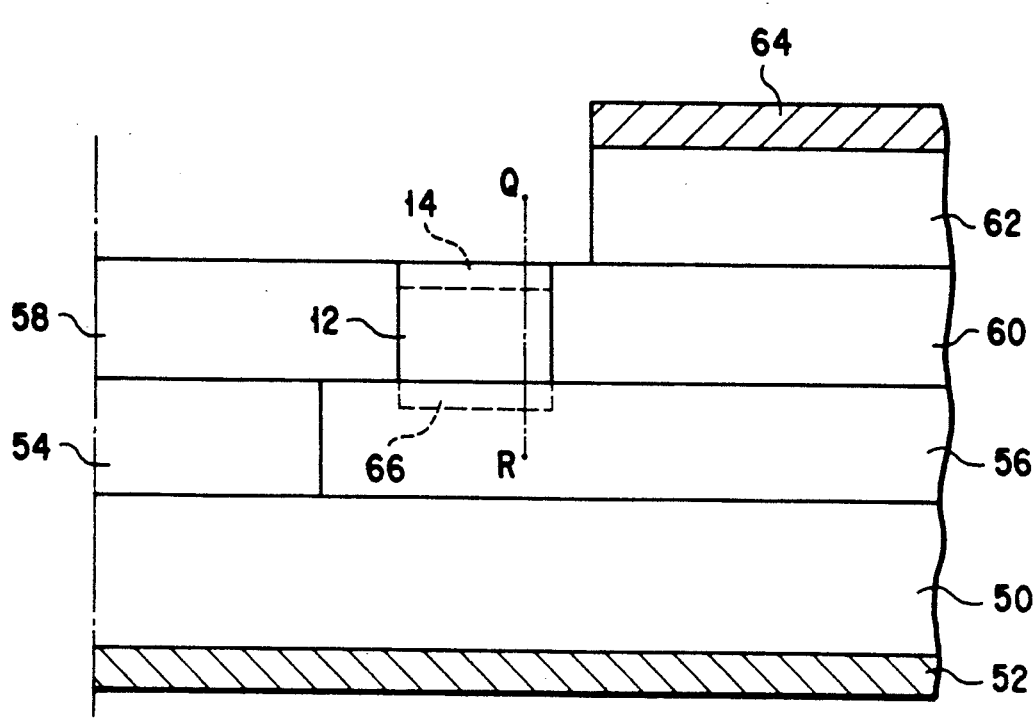
FIG. 12 is a sectional view of the ring laser apparatus taken along line O-P of FIG. 11.
Figure 13:
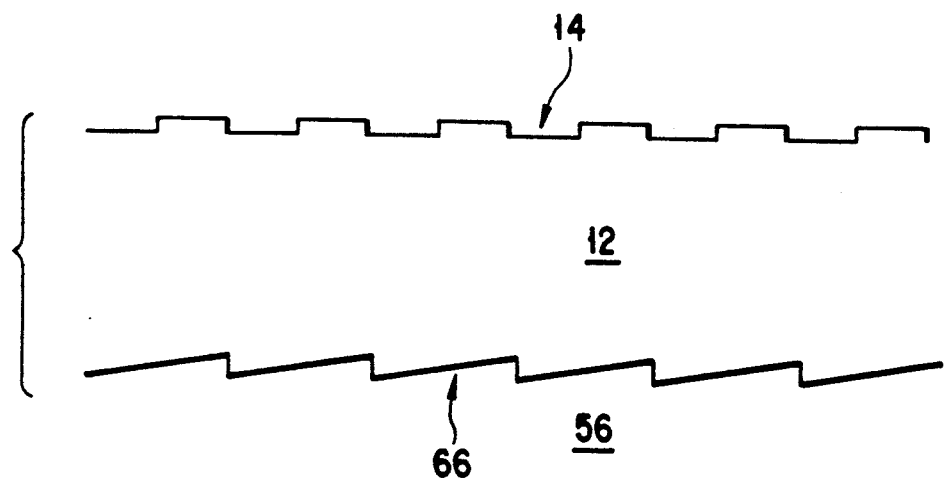
FIG. 13 is a sectional view of the ring laser apparatus taken along line Q-R of FIG. 12.

Referring now to FIGS. 11 to 13, a ring laser apparatus according to a seventh embodiment of the present invention will be described. In this apparatus, an electrode 52 is disposed on the lower surface of a disk-shaped n-type GaAs substrate 50. A disk-shaped n-type AlGaAs layer 54 is disposed in the center of the upper surface of the substrate 50, and a genuine AlGaAs layer 56 is arranged outside the layer 54. A disk-shaped n-type AlGaAs layer 58 is disposed on the central portion of the layer 56, a ring-shaped waveguide or n-type GaAs active layer 12 is arranged outside the layer 58, and a p-type AlGaAs layer 60 is arranged outside the layer 12. A p-type GaAs layer 62 is disposed on the upper surface of the layer 60, and an electrode 64 on the layer 62.

As shown in FIG. 13, gratings 14 and 66 are arranged on the upper and lower surfaces, respectively, of the ring-shaped waveguide 12. The grating 14 has a configuration such that its height is represented by a two-valued periodic function. The grating 14 serves to couple a light beam in the waveguide 12 to the outside. The grating 66 has a configuration such that its height is represented by a periodic function which varies linearly. The respective periods of the gratings 14 and 66 are slightly different from each other, and the teeth of one grating are more than those of the other by one. Further, the grating 66 is higher in profile than the grating 14, and is asymmetric with respect to the circumferential direction. Thus, the grating 66 can serve to determine the wavelength and direction of traveling waves in the ring-shaped waveguide 12.

When voltage is applied between the electrodes 52 and 64, a light beam is excited in the ring-shaped waveguide or active layer 12. The wavelength and propagation direction of the excited light beam depend on the arrangement of the grating 66. The light beam is partially radiated to the outside by the grating 14 in a manner such that it is amplified by inductive discharge as it is propagated through the ring-shaped active layer 12. As in the case of the first embodiment, the radiated light beam is a circular polarized beam.

Referring now to FIGS. 12 and 14A to 14D, a method for manufacturing the aforementioned ring laser apparatus will be described.

Figure 14A:
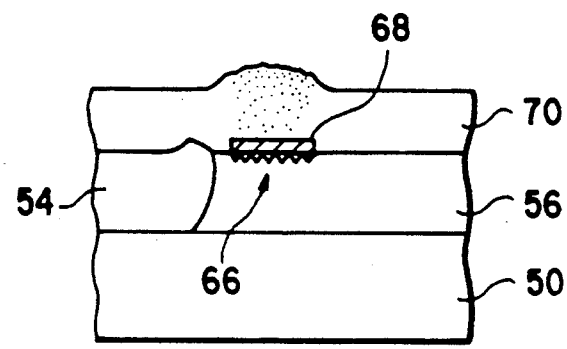
FIGS. 14A to 14D illustrate manufacturing processes for obtaining the structure shown in FIG. 12.

First, the genuine AlGaAs layer 56 is formed on the n-type GaAs substrate 50 by epitaxial growth. The central portion of the layer 56 is selectively removed by etching using an SiO₂ or Si₃N₄ mask (not shown), and the n-type AlGaAs layer 54 is formed in the etched region by epitaxial growth. After the mask is removed, the grating 66 is selectively formed on the surface of the genuine AlGaAs layer 56 by the electronic drawing method. After an SiO₂ or Si₃N₄ mask 68 is formed on the grating 66, an undoped AlGaAs layer 70 is grown. Thereupon, AlGaAs on the mask 68 is polycrystallized (FIG. 14A).

Figure 14B:
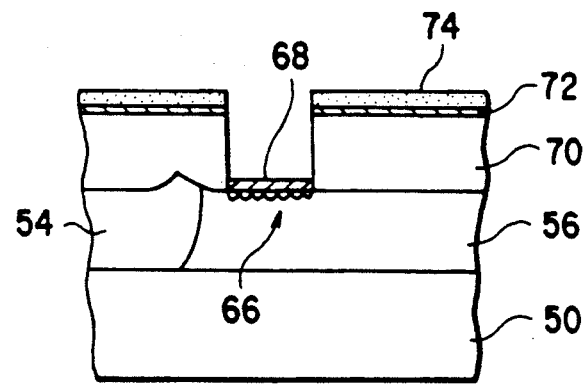

Then, a resist pattern 74 is formed over the nonpolycrystallized portion of the undoped AlGaAs layer 70 with an SiO₂ film 72 between them. The resulting structure is etched with use of the pattern 74 as a mask so that the mask 68 is exposed, and the polycrystallized portion of the AlGaAs layer is removed (FIG. 14B).

Figure 14C:
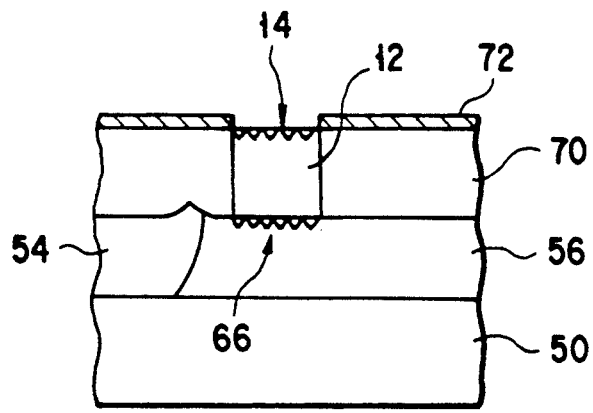

Subsequently, the mask 68 is removed, and the n-type GaAs active layer (waveguide) 12 is formed on the grating 66 by epitaxial growth. The grating 14 is formed on the active layer 12 by the electronic drawing method (FIG. 14C).

Figure 14D:
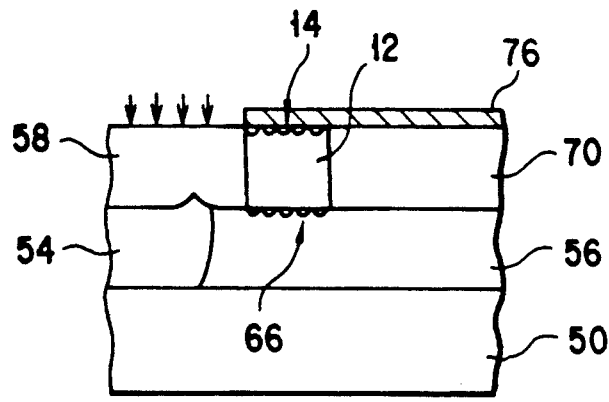

Thereafter, a mask 76 is formed on the active layer 12 and the undoped AlGaAs layer 70 outside the same, an n-type dopant is ion-implanted into the layer 70 to form the n-type AlGaAs layer 58 (FIG. 14D).

Finally, the mask 76 is removed, and the undoped AlGaAs layer 70 is doped with a p-type dopant by a conventional method, thereby forming a p-type AlGaAs layer 60. Thereafter, the p-type GaAs layer 62 and the p- and n-side electrodes 64 and 52 are arranged in their respective predetermined positions, whereupon the ring laser apparatus according to the present embodiment is completed (FIG. 12).

Figure 15:
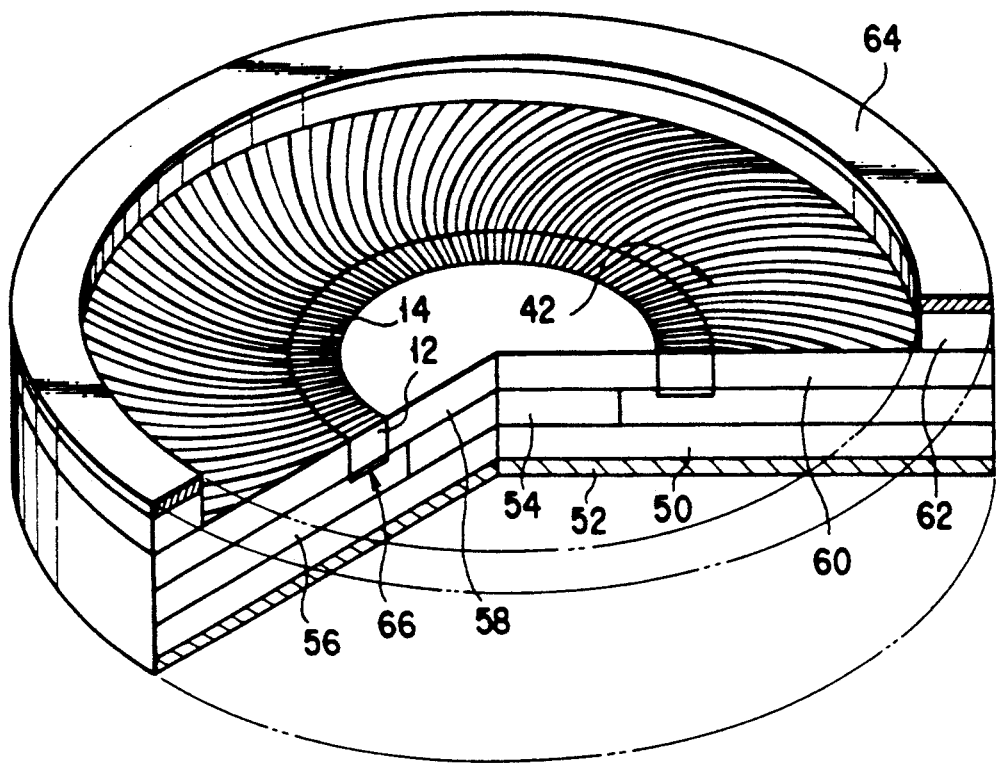
FIG. 15 is a perspective view, partially in section, show a ring laser apparatus according to an eighth embodiment of the invention.

Referring now to FIG. 15, a ring laser apparatus according to an eighth embodiment of the present invention will be described. The apparatus of the present embodiment is constructed in the same manner as the apparatus of the seventh embodiment, provided that a p-type GaAs layer 62 and an electrode 64 are formed on the peripheral edge of a p-type AlGaAs layer 60, and that the grating 42 described in connection with the fourth embodiment is formed on the upper surface of that portion of the layer 60 which extend between a ring-shaped waveguide or active layer 12 and the layer 62.

According to the present embodiment, a light beam excited in the active layer 12 as voltage is applied between an electrode 52 and the electrode 64 is amplified by inductive discharge as it is propagated through the ring-shaped active layer 12. Part of the light beam is emitted to the outside by a grating 14, and another part leaks to the outside of the layer 12. The leakage light beam is emitted to the outside by the grating 42 as it is propagated through the p-type AlGaAs layer 60. The ring laser apparatus of the present embodiment, which is provided with the grating 42 for coupling the leakage light beam to the outside, can enjoys a higher conversion efficiency than that of the apparatus of the seventh embodiment.

Figure 17:
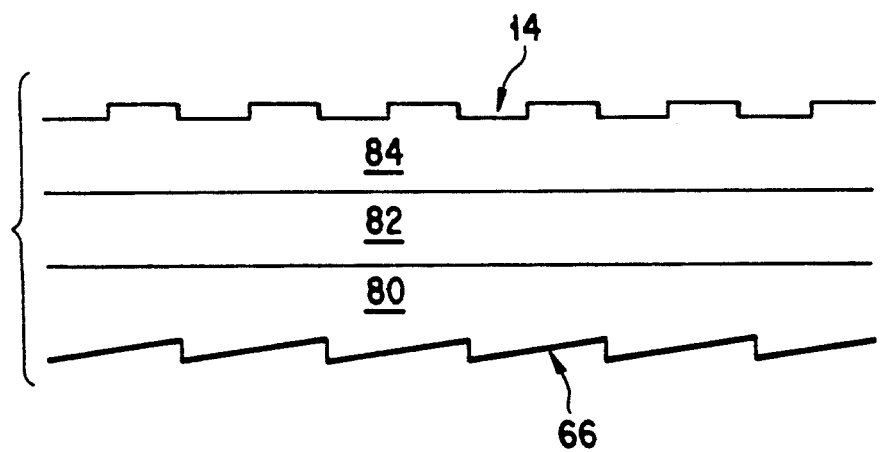
FIG. 17 is a side sectional view of a ring-shaped waveguide of the ring laser apparatus shown in FIGS. 16A and 16B.

Referring now to FIGS. 16A, 16B and 17, a ring laser apparatus according to a ninth embodiment of the present invention will be described. The apparatus of the present embodiment, which excites a light beam by optical pumping, has a ring-shaped waveguide 12 on a substrate 76, as shown in FIGS. 16A and 16B. As in the case of the fifth embodiment, a trapping layer 78 for confining a light beam leaked from the waveguide 12 is arranged outside the waveguide 12. The layer 78 has a refractive index lower than that of the waveguide 12, and a grating 42 for radiating a light beam propagated through the layer 78 to the outside is formed on the upper surface of the layer 78. As shown in FIG. 17, the ring-shaped waveguide 12 has a three-layer structure such that an InGaAPP cap layer 84 and an InGaAsP barrier layer 80 are arranged on the upper and lower surfaces, respectively, of an InGaAs active layer 82. A grating 66 for determining the wavelength and direction of the propagated light beam is formed on the lower surface of the barrier layer 80, while a grating 14 for radiating the light beam to the outside is formed on the upper surface of the cap layer 84. The teeth of one of the gratings 14 and 66 are more than those of the other by one. The gratings 66 and 14 serve for wavelength selection and radiation of the light beam to the outside, respectively.

When a pump light is externally applied to the ring laser apparatus of the present embodiment, a light beam is excited in the active layer 82. This excited light beam is amplified by inductive discharge as it is propagated through the ring-shaped waveguide 12. Part of the light beam is emitted to the outside by the grating 14, and another part leaks to the outside of the waveguide 12. The leakage light beam is emitted to the outside by the grating 42 as it is propagated through the trapping layer 78.

Figure 19:
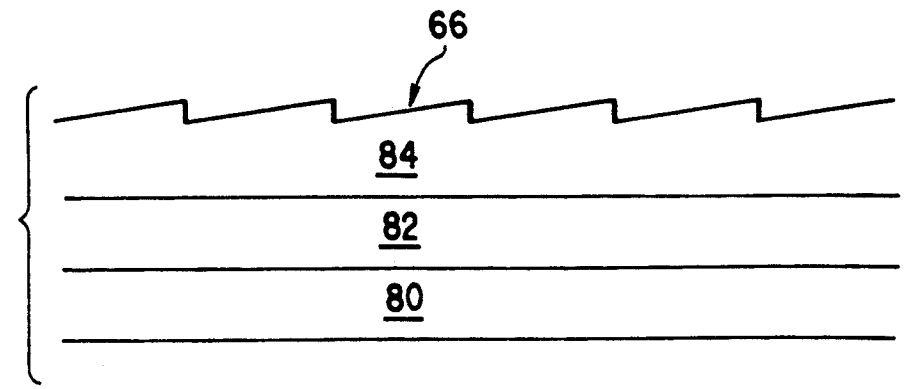
FIG. 19 is a side sectional view of a ring-shaped waveguide of the ring laser apparatus shown in FIGS. 18A and 18B.
Figure 18A:
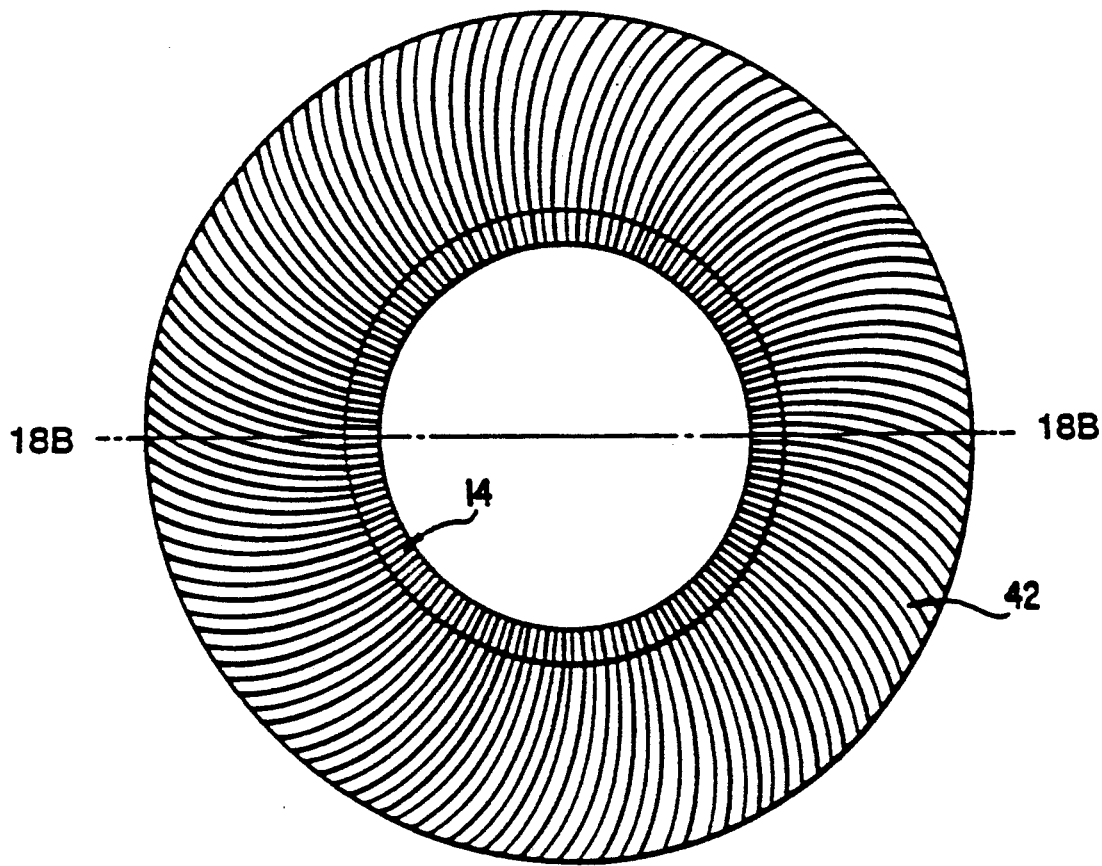
FIG. 18A is a top view of a ring laser apparatus according to a tenth embodiment of the invention.
Figure 18B:
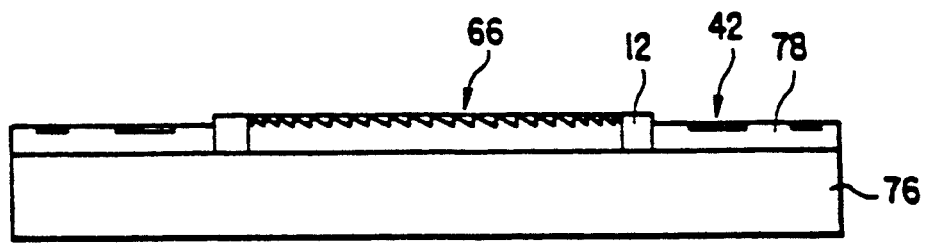
FIG. 18B is a sectional view of the ring laser apparatus taken along line 18B—18B of FIG. 18A.

Referring now to FIGS. 18A, 18B and 19, a ring laser apparatus according to a tenth embodiment of the present invention will be described. As seen from FIGS. 18A and 18B, the apparatus of the present embodiment has the same construction as the apparatus of the ninth embodiment except for the arrangement of the ring-shaped waveguide 12. In the waveguide 12 of the tenth embodiment, as shown in FIG. 19, a grating 66 for wavelength selection is formed on the upper surface of an InGaAsP cap layer 84, not on an InGaAsP barrier layer 80.

When a pump light is applied to the ring laser apparatus of the present embodiment, a light beam is excited in the InGaAs active layer 82. Thereupon, the light beam, whose wavelength depends on the arrangement of the grating 66, is amplified as it is propagated in a predetermined direction through the ring-shaped waveguide 12. A leakage light beam from the waveguide 12 is emitted to the outside by a grating 42 as it is propagated through a trapping layer 78.

According to the present embodiment, no grating is arranged on the lower surface of the ring-shaped waveguide 12, so that the apparatus can be manufactured more easily than the apparatus of the ninth embodiment. Since the light beam is radiated to the outside by means of only the grating 42 which is arranged on the upper surface of the trapping layer 78, moreover, the waveguide 12 should preferably have the smallest possible diameter for the greatest volume of leakage light. This is a favorable condition for the miniaturization of the device.

In the above description, it is supposed that the waveguide has an ordinary rectangular cross section, without giving any special consideration to the sectional shape or configuration of the waveguide. The following is a description of the sectional configuration of the waveguide.

A Maxwell equation for the light beam or electromagnetic waves in the waveguide is given as follows:

$$\nabla \times E = -j\omega\mu_0 H,$$

$$\nabla \times H = j\omega\epsilon_0 n^2 E,$$

$$\nabla \cdot E = 0,$$

$$\nabla \cdot H = 0,$$

where E is an electric field, H is a magnetic field, j is an imaginary unit, $\omega$ is the frequency (rad/t), $\mu_0$ is the permeability of vacuum, $\epsilon_0$ is the dielectric constant, and n is the refractive index.

Let us suppose a cylindrical coordinate system whose origin is on the center of the curvature of a bent waveguide, and which has no dependence with respect to the $\theta$-direction. In association with this system, $-j\nu$ ($\nu$: angular propagation constant) is substituted for a differential with respect to $\theta$ ($\partial/\partial\theta = -j\nu$), and is subjected to scalar approximation. If the radius of curvature is great, in this case, the following Helmholtz equation can be obtained.

$$p\frac{1}{r}\frac{\partial}{\partial r}\left(r\frac{\partial\phi}{\partial r}\right) - p\frac{\nu 2}{r^2}\phi + p\frac{\partial 2\phi}{\partial Z^2} + qk_0^2 = 0 \quad (4)$$

where $\phi$, p, and q are $$\phi = E_r, p = 1, \text{ and } q = n^2,$$

respectively, for a TE-like mode, and $$\phi = H_r, p = 1/n^2, \text{ and } q = 1,$$

respectively, for a TM-like mode.

Figure 20:
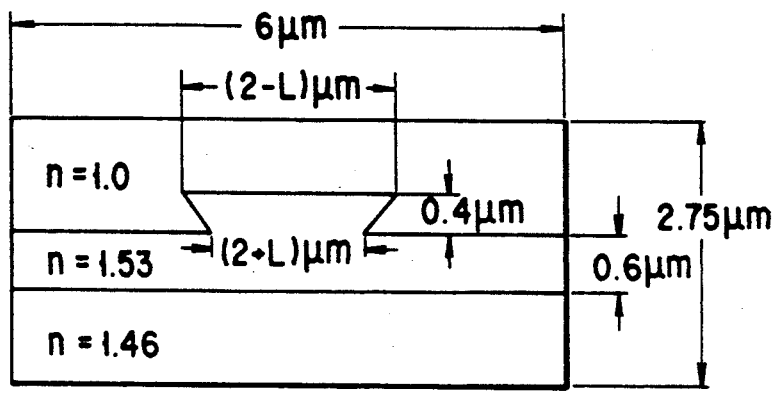
FIG. 20 shows a sectional configuration used in examining various properties of the sectional configuration of the waveguide.
Figure 21:
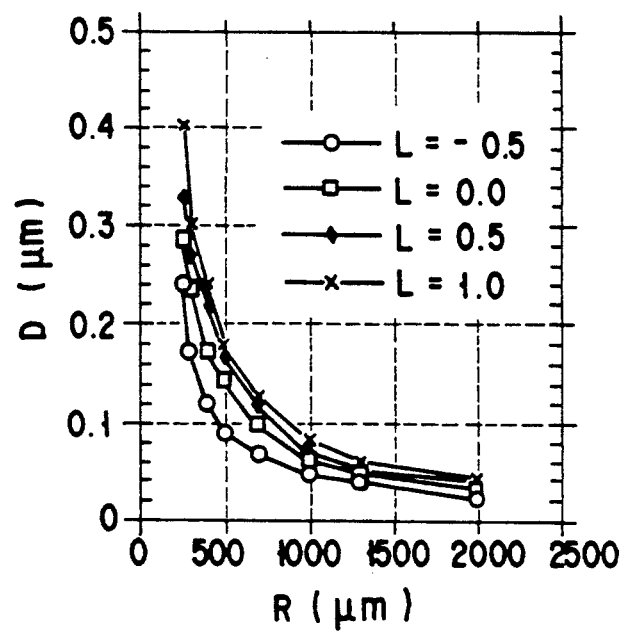
FIG. 21 is a graph illustrating variations of the movement D of the maximum light intensity point compared with variations of the radius of curvature R.

Equation (4) is solved for a waveguide having the sectional configuration shown in FIG. 20 by the finite element method, and the value of outward movement D of the maximum light intensity point with respect to the radius of curvature R of the center line of the bent waveguide is obtained for each of values −0.5, 0.0, 0.5, and 1.0 for the distance L. FIG. 21 is a graph showing the movement D. The movement D of the maximum intensity point is a distance between the center line of the bent waveguide and the point for the maximum light intensity. In the graph of FIG. 21, the movement D for every curvature radius R is smaller with L=−0.5 than with L=0. Naturally, the movement D is 0 in the case of a straight waveguide, that is, with R=∞. The nearer the distribution of the electromagnetic field, moreover, the smaller the loss of waveguide connection is. Accordingly, the loss in the vicinity of the junction between straight and bent portions is smaller in the case of a waveguide having a cross section in the shape of an inverted trapezoid than in the case of a waveguide having an ordinary rectangular cross section. Although only the results of calculation of the values for the configuration shown in FIG. 20 are given, the values are not limited to this configuration, and may be applied in general to other configurations in which the maximum width is greater than the width at the bottom, as shown in FIGS. 22A to 22L. The loss at the junction between the ring and the straight portion can be reduced by incorporating this arrangement in the fourth embodiment.

Figure 23:
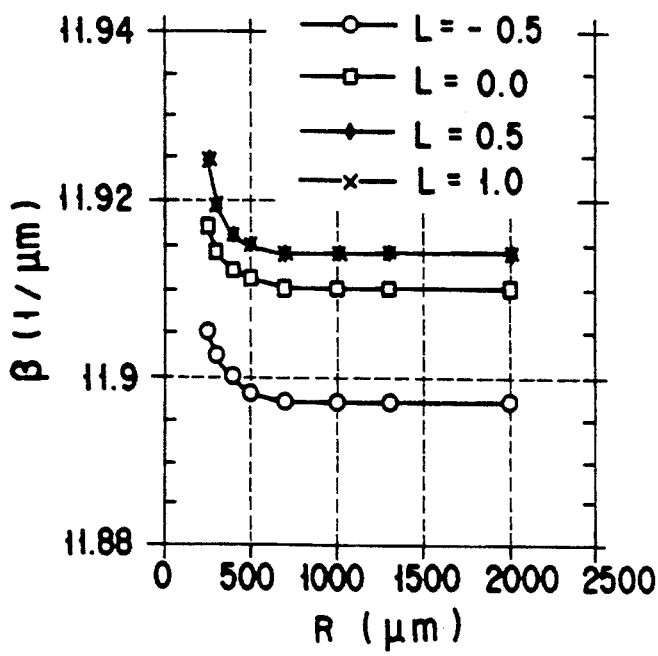
FIG. 23 is a graph illustrating variations of the propagation constant $\alpha$ compared with variations of the radius of curvature R.
Figure 22A:
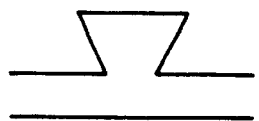
FIGS. 22A to 22L show various sectional shapes of waveguides with a small loss at the junction between straight and bent portions.
Figure 22C:
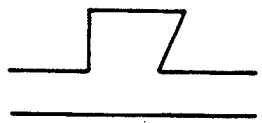
Figure 22E:
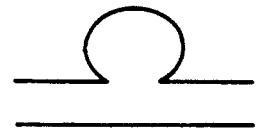
Figure 22B:
Figure 22D:
Figure 22F:
Figure 22G:
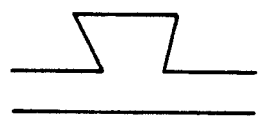
Figure 22I:
Figure 22K:
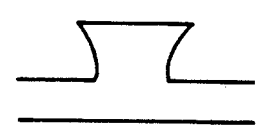
Figure 22H:
Figure 22J:
Figure 22L:
Figure 24A:
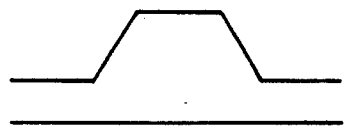
FIGS. 24A to 24L to show various sectional shapes of waveguides with small variations of the propagation constant.
Figure 24B:
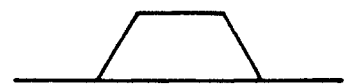
Figure 24C:
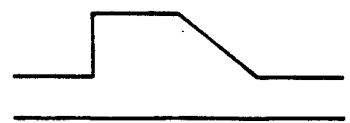
Figure 24D:
Figure 24E:
Figure 24F:
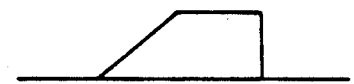
Figure 24G:
Figure 24H:
Figure 24I:
Figure 24J:
Figure 24K:
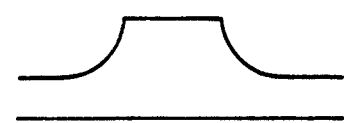
Figure 24L:
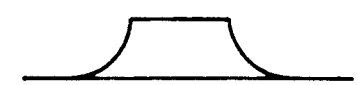

Further, equation (4) is solved for the waveguide having the sectional configuration shown in FIG. 20 by the finite element method, and a propagation constant $\beta$ with respect to the radius of curvature R of the center line of the bent waveguide is obtained for each of values −0.5, 0.0, 0.5, and 1.0 for the distance L. FIG. 23 is a graph showing the propagation constant $\beta$. The propagation constant $\beta$ is given by $\beta = \nu/R$. If L varies in this graph, $\beta$ also varies as a rule. Curves for L=0.5 and L=1.0 substantially overlap each other, that is, the variation of $\beta$ between L=0.5 and L=1.0 is much smaller than that between L=0 and L=0.5. Thus, if the bent waveguide having the configuration shown in FIG. 20 is given 0.5<L<1.0, the propagation constant $\beta$, as the most important characteristic parameter, is stable, varying less than in the case of the conventional rectangular configuration (L=0), even though L varies due to a manufacturing error or the like. Although only the results of calculation of the values for the structure of FIG. 20 are given, the values are not limited to this configuration, and may be applied in general to other configurations which have a portion such that the length of the cross section of the waveguide in the direction parallel to the substrate is shorter than the length of that portion of the waveguide which is in contact with the substrate.

Figure 25A:
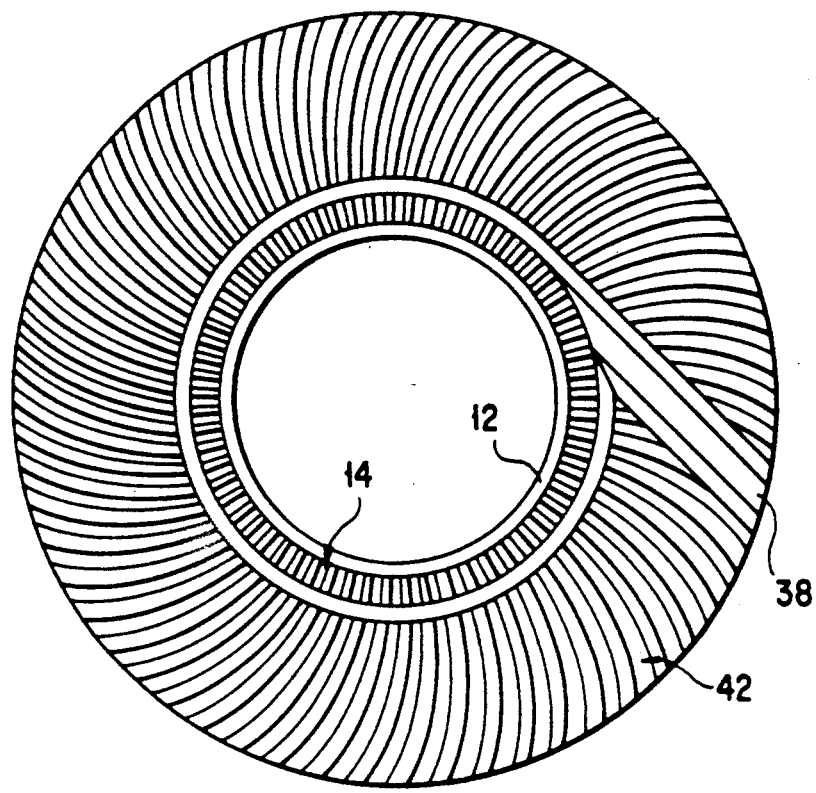
FIG. 25A is a top view of an optical connector according to an eleventh embodiment of the invention, using a waveguide with small variations of the propagation constant.
Figure 25B:
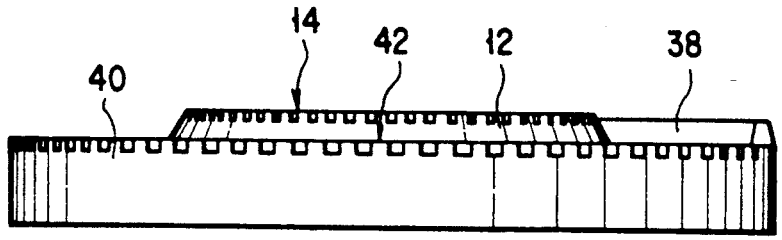
FIG. 25B is a view of the optical connector shown in FIG. 25A.
Figure 25C:
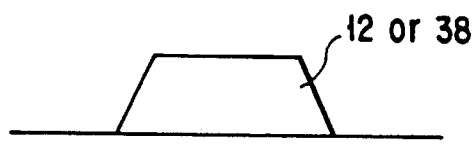
FIG. 25C shows the sectional shape of the waveguide of the optical connector shown in FIGS. 25A and 25B.

Optical elements having the ring-shaped waveguides according to the embodiments described above are expected to have a stabilized propagation constant $\beta$. Referring now to FIGS. 25A to 25C, an optical connector according to an eleventh embodiment of the present invention will be described. According to the present embodiment, the aforesaid concept or arrangement is applied to the waveguide of the optical connector of the fourth embodiment, in order to stabilize the propagation constant $\beta$. As shown in FIGS. 25A and 25B, the optical connector of the eleventh embodiment is constructed in the same manner as that of the fourth embodiment, except for the sectional configuration of a ring-shaped waveguide 12 and a straight waveguide 38. As shown in FIG. 25C, the waveguides 12 and 38 have a trapezoidal sectional configuration.

According to the optical connector of the present embodiment, although the propagation constant is stabilized due to the trapezoidal sectional configuration of the waveguides, a substantial loss is caused by radiation attributable to the bend of the ring-shaped waveguide. Since an outward radiant light beam produced by the bend of the ring-shaped waveguide, like a radiant beam from a grating on the upper surface of the ring-shaped waveguide, is coupled to a radiant beam emitted to the outside of a plane containing the ring, by means of a grating outside the ring-shaped waveguide, however, an increase of the radiation loss attributable to the bend of the waveguide arouses no problem.

Since the optical connector of the present embodiment enjoys a stabilized propagation constant, the mode of propagation in the waveguide is less liable to deviate from the design due to a manufacturing error or the like. Thus, the possibility of the coupling efficiency being lowered due to inconformity with the gratings can be reduced.

The following is a description of the width of the waveguides, which influences the light beam propagation mode. It is to be desired that the propagation mode should be stabilized. Stable propagation modes include a whispering-gallery mode in a disk-shaped waveguide. The disk-shaped waveguide can be regarded as a modification of the ring-shaped waveguide, and can be used in place of the ring-shaped waveguide in the foregoing embodiments. Requiring a wider setting area, however, the disk-shaped waveguide is disadvantageous in view of the miniaturization of the device. The inventor hereof found that even the ring-shaped waveguide can enjoy a propagation mode equivalent to the whispering-gallery mode if its width is selected properly. The following is a description of this finding.

Figure 26:
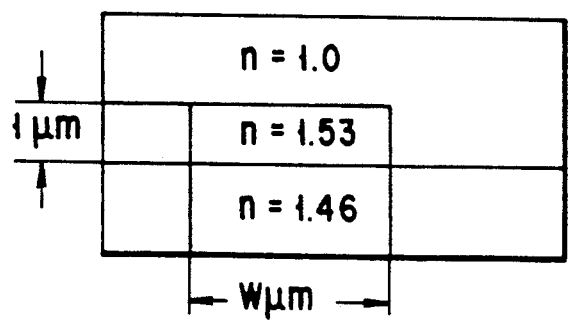
FIG. 26 shows a sectional configuration used in examining width of the waveguide and a propagation mode.
Figure 27:
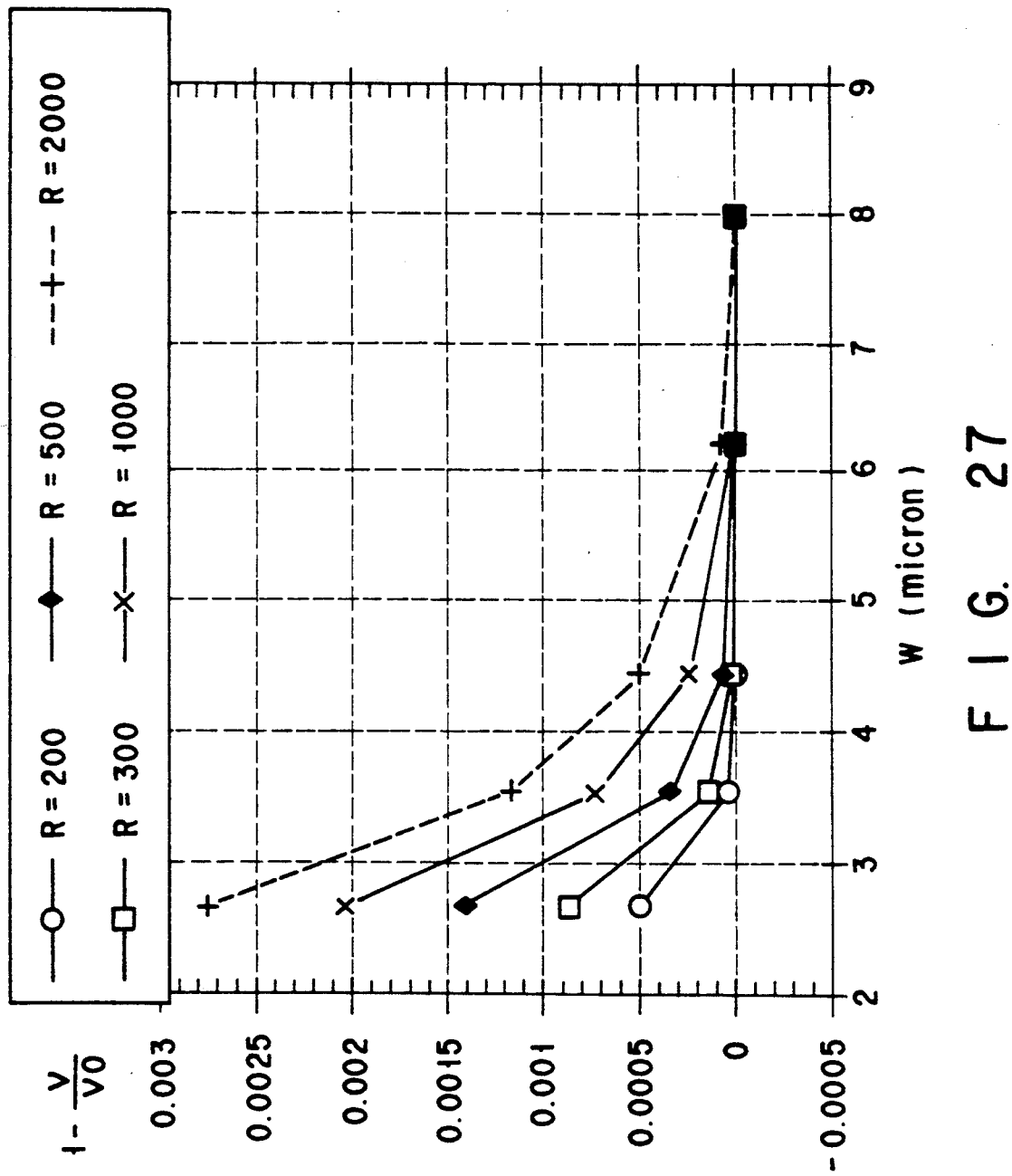
FIG. 27 is a graph illustrating variations of the angular propagation constant $\nu$ compared with variations of the width W of the waveguide.
Figure 28A:
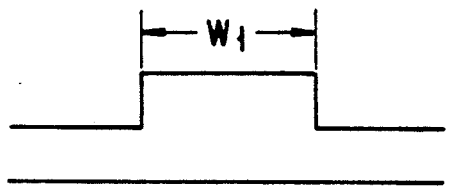
FIGS. 28A to 28H show various sectional shapes of waveguides in which light is propagated in a whispering-gallery mode.
Figure 28B:
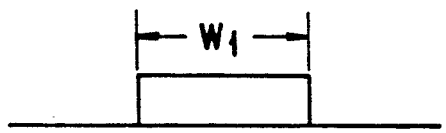
Figure 28C:
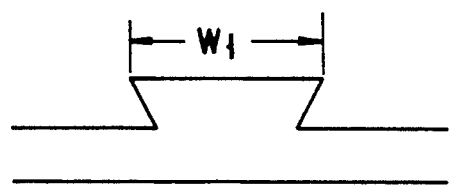
Figure 28D:
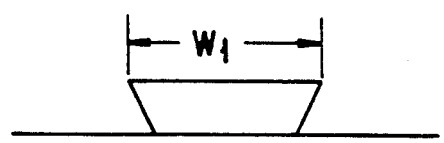
Figure 28E:
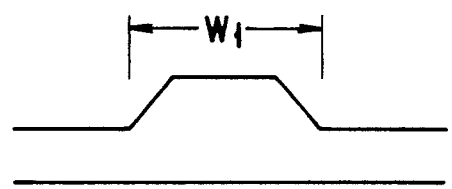
Figure 28F:
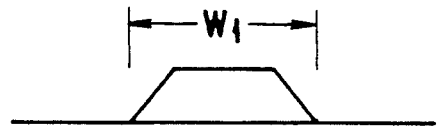
Figure 28G:
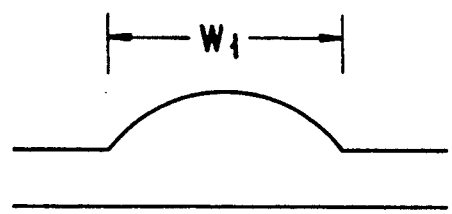
Figure 28H:
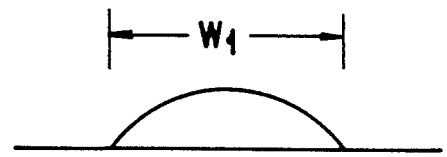

Equation (4) is solved for a waveguide having the sectional configuration shown in FIG. 26 by the finite element method, and variations of the angular propagation constant $\nu$ are calculated. FIG. 27 is a graph showing the results of the calculation. In this graph, the axes of abscissa and ordinate represent the width W of the waveguide and $(\nu_0 - \nu)/\nu_0$, respectively, where $\nu_0$ is the value of $\nu$ obtained when W=R is given, that is, in the case of a disk-shaped configuration. If W becomes greater than a predetermined value (e.g., $W_0$), as seen from the graph of FIG. 27, $(\nu_0 - \nu)/\nu_0$ or $\nu$ ceases to vary. Thus, in a ring-shaped waveguide having a width greater than the predetermined value $W_0$, the propagation mode is equivalent to the whispering-gallery mode. If the waveguide is designed having a width not smaller than a value obtained by adding the manufacturing error to the predetermined value $W_0$, the propagation constant or propagation mode can never vary under the influence of the manufacturing error or the like. Thus, if the waveguide has a width $W_1$ ($> W_0$), as shown in FIGS. 28A to 28H, the propagation mode of the light beam is invariable without regard to the sectional configuration of the waveguide.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical system comprising:
   a substrate;
   a ring-shaped optical waveguide on the substrate;
   introduction means for introducing a light flux into the optical waveguide; and
   a grating arranged on the upper surface of the optical waveguide so as to extend along the circumference of the ring of the waveguide and spreading in the radial direction of the ring, the grating having a cycle such that the respective phases of the grating and a propagated light beam are deviated from each other substantially by $\pi$ when the light beam is propagated half round the optical waveguide.

2. An optical system according to claim 1, wherein said grating has a cycle given by $2\pi r\lambda/2\pi r + \lambda)$ or $2\pi r\lambda/(2\pi r - \lambda)$, where r and $\lambda$ are respectively a distance between an optical path in the ring shaped optical waveguide, and a center of curvatures of the ring-shaped optical waveguide and the wavelength of the propagated light beam in the optical waveguide, respectively.

3. An optical system according to claim 1, wherein said introduction means comprises an optical waveguide arranged in the vicinity of the ring-shaped optical waveguide.

4. An optical system according to claim 1, wherein said introduction means comprises an optical waveguide connected in the vicinity of the ring-shaped optical waveguide.

5. An optical system according to claim 1, wherein said introduction means includes a light source, two optical waveguides optically connected to the ring-shaped optical waveguide, and an optical switch for alternatively supplying a light beam from the light source to one of the two optical waveguides.

6. An optical system according to claim 1, wherein said introduction means includes a light source, two optical waveguides optically connected to the ring-shaped optical waveguide, an optical switch for distributing a light beam from the light source to the two optical waveguides, and means for controlling the phase of the light beam propagated through the two optical waveguides.

7. An optical system according to claim 1, which further comprises another grating for emitting a light beam leaked from the ring-shaped optical waveguide, the grating having as many teeth as those of the first grating and being arranged outside the optical waveguide so as to spread radially from the center of the waveguide.

8. An optical system according to claim 7, wherein said second grating has a radial cycle expressed by a Hankel function.

9. An optical system according to claim 7, which further comprises a trapping layer for confining the light beam leaked from the ring-shaped optical waveguide, the trapping layer having a refractive index higher than that of the substrate and lower than that of the optical waveguide and being arranged outside the waveguide, and wherein said second grating is formed on the trapping layer.

10. An optical system according to claim 1, wherein said grating is shifted in the circumferential direction for a phase difference produced on the basis of a set focal point and the width of the ring-shaped optical waveguide.

11. An optical system according to claim 7, wherein said first and second gratings are shifted in the circumferential direction for a phase difference produced on the basis of the radial distance between a set focal point and the ring-shaped optical waveguide.

12. An optical system according to claim 1, wherein the maximum value of the width of said ring-shaped optical waveguide is set within a range such that the propagation constant takes a substantially constant value with respect to the maximum width of the waveguide.

13. An optical system according to claim 1, wherein said ring-shaped optical waveguide has a sectional configuration such that the maximum value of the width of the optical waveguide is greater than the value of the length of that portion thereof which is in contact with the substrate.

14. An optical system according to claim 1, wherein said ring-shaped optical waveguide has a sectional configuration such that the length of that portion thereof which is in contact with the substrate is the greatest.

15. An optical system comprising:
    a substrate;
    a ring-shaped optical waveguide on the substrate;
    excitation means for generating a light beam propagated through the optical waveguide;
    a wavelength selection grating for determining the wavelength and advancing direction of the light beam, the waveguide selection grating being arranged along the circumference of the optical waveguide so as to spread in the radial direction of the ring of the waveguide and having a cycle equivalent to the wavelength or half the wavelength of the light beam; and
    a radiation grating for radiating the light beam to the outside, the radiation grating being arranged along the circumference of the optical waveguide so as to spread in the radial direction of the ring and having a cycle such that the respective phases of the grating and the propagated light beam are deviated from each other substantially by x when the light beam is propagated 180° around the optical waveguide.

16. An optical system according to claim 15, wherein said excitation means includes means for charging the ring-shaped optical waveguide with electricity.

17. An optical system according to claim 15, wherein said excitation means includes means for irradiating the ring-shaped optical waveguide.

18. An optical system according to claim 15, wherein said wavelength selection grating is arranged on the lower surface of the ring-shaped optical waveguide, and said radiation grating is arranged on the upper surface of the optical waveguide.

19. An optical system according to claim 15, wherein said radiation grating has a cycle given by $2\pi r\lambda/(2\pi r+\lambda)$ or $2\pi r\lambda/(2\pi r-\lambda)$, where $r$ and $\lambda$ are respectively a distance between an optical path in the ring-shaped optical waveguide and the center of curvature of the ring-shaped optical waveguide, and the wavelength of the propagated light beam, respectively.

20. An optical system according to claim 15, wherein said wavelength selection grating is higher in profile than the radiation grating, and has an asymmetric configuration with respect to the circumferential direction.

21. An optical system according to claim 15, which further comprises another grating for emitting a light beam leaked from the ring-shaped optical waveguide, the grating having as many teeth as those of the first grating and being arranged outside the optical waveguide so as to spread radially from the center of the waveguide.

22. An optical system according to claim 21, wherein said second grating has a radial cycle expressed by a Hankel function.

23. An optical system according to claim 21, which further comprises a trapping layer for confining the light beam leaked from the ring-shaped optical waveguide, the trapping layer having a refractive index higher than that of the substrate and lower than that of the optical waveguide and being arranged outside the waveguide, and wherein said second grating is formed on the upper surface of the trapping layer.

24. An optical system according to claim 15, wherein said grating is shifted in the circumferential direction for a phase difference produced on the basis of a set focal point and the width of the ring-shaped optical waveguide.

25. An optical system according to claim 21, wherein said first and second gratings are shifted in the circumferential direction for a phase difference produced on the basis of the radial distance between a set focal point and the ring-shaped optical waveguide.

26. An optical system according to claim 15, wherein the maximum value of the width of said ring-shaped optical waveguide is set within a range such that the propagation constant takes a substantially constant value with respect to the width of the waveguide.

27. An optical system according to claim 15, wherein said ring-shaped optical waveguide has a sectional configuration such that the length of that portion thereof which is in contact with the substrate is the greatest.

28. An optical system comprising:
    a substrate;
    a ring-shaped optical waveguide on the substrate;
    excitation means for generating a light beam propagated through the optical waveguide;
    a wavelength selection grating for determining the wavelength and advancing direction of the light beam, the waveguide selection grating being arranged along the circumference of the optical waveguide so as to spread in the radial direction of the ring of the waveguide and having a cycle equivalent to the wavelength or half the wavelength of the light beam;
    a trapping layer for confining the light beam leaked from the ring-shaped optical waveguide, the trapping layer having a refractive index higher than that of the substrate and lower than that of the optical waveguide and being arranged outside the waveguide; and
    a radiation grating on the trapping layer for radiating the light beam to the outside.

29. An optical system according to claim 28, wherein said excitation means includes means for irradiating the ring-shaped optical waveguide.

30. An optical system according to claim 28, wherein said wavelength selection grating is higher in profile than the radiation grating, and has an asymmetric configuration with respect to the circumferential direction.

31. An optical system according to claim 28, wherein said radiation grating has a radial cycle expressed by a Hankel function.

32. An optical system according to claim 28, wherein said radiation grating is shifted in the circumferential direction for a phase difference produced on the basis of the radial distance between a set focal point and the ring-shaped optical waveguide.

33. An optical system according to claim 28, wherein the maximum value of the width of said ring-shaped optical waveguide is set within a range such that the propagation constant takes a substantially constant value with respect to the width of the waveguide.

34. An optical system according to claim 28, wherein said ring-shaped optical waveguide has a sectional configuration such that the length of that portion thereof which is in contact with the substrate is the greatest.

* * * * *